Feb. 29, 1944. G. A. BATE 2,342,830
MICROMETER CONTROL
Filed Aug. 30, 1941

INVENTOR
George A. Bate
BY Nathaniel Ely
ATTORNEY

UNITED STATES PATENT OFFICE 2,342,830

MICROMETER CONTROL

George A. Bate, Ridgefield Park, N. J., assignor to The Lummus Company, New York, N. Y., a corporation of Delaware Application August 30, 1941, Serial No. 409,003

3 Claims. (Cl. 74—424.8)

This invention relates to improvements in variable volume control apparatus and more particularly to a volume control of micrometric accuracy for proportioning mechanisms such as positive displacement rotary pumps and the like.

In many industrial fields proportioning devices are used to control the amount or the magnitude of the various components or materials that are introduced to blending equipment or the like. In the blending of lubricating oils, for example, it is frequently necessary to mix proportioned quantities of as many as four or five principal streams of different lubricating oil stocks and one or more minor streams of additives such as pour point depressants or the like. The quantities of all of these streams must be controlled within very small limits of accuracy in order to efficiently produce the desired blended product.

One form of apparatus which has proved especially satisfactory in the lubricating oil blending field and to which my invention applies is shown in the patent to Cornell, No. 2,109,331, issued February 22, 1938. In this construction the proportioning devices are positive displacement rotary pumps, and the capacity or volume of each pump is controlled by a handwheel having a micrometer type of housing that indicates the degree of volume control.

In the commercial operation of such proportioning devices it has been customary to install two or more large size pumps for the principal oil streams and one or more fractional sized pumps for the minor additive streams. This arrangement has proved expensive, however, not only because of the additional cost of the different size units that are required in small numbers only but also because of the special mountings required and the added expense of calibration. Standardization is preferable if the results are equal.

The principal object of my invention is to provide a standardized size of proportioning device having a volume control variable between zero and unity and having a single indicating scale so that uniform readings on a plurality of such devices give proportional percentage flows based on the scale volume settings.

A more specific object of my invention is to provide an intermediate screw coupling in combination with a micrometer screw control for a variable columne control apparatus so that the control device is positively moved within the range of the micrometer screw control only that percentage of the full range of the latter as determined by the characteristics of the intermediate screw coupling.

More specifically, it is an object of my invention to provide a micrometer screw control for the volume of a positive displacement rotary pump, which screw control is so arranged with respect to the volume control pump plunger that, by the substitution of one coupling between the screw control and the pump plunger for another, it is possible to have the same adjustment of the micrometer screw control indicate different proportional differences of opening of the pump plunger control, the differences being whole numbers of one with respect to the other.

A more specific object of my invention is to provide an adapter to be interconnected between a micrometer screw adjustment and a volume control device, which adapter includes a screw threaded housing and an intermediate screw interconnected to the micrometer screw to give a proportional movement to the control device based upon the relative pitches of the screw threads of the intermediate screw and the micrometer screw.

Further objects and advantages of my invention will appear from the following disclosure of a preferred form of embodiment thereof taken in connection with the attached drawing, illustrative thereof, in which.

Figure 1:
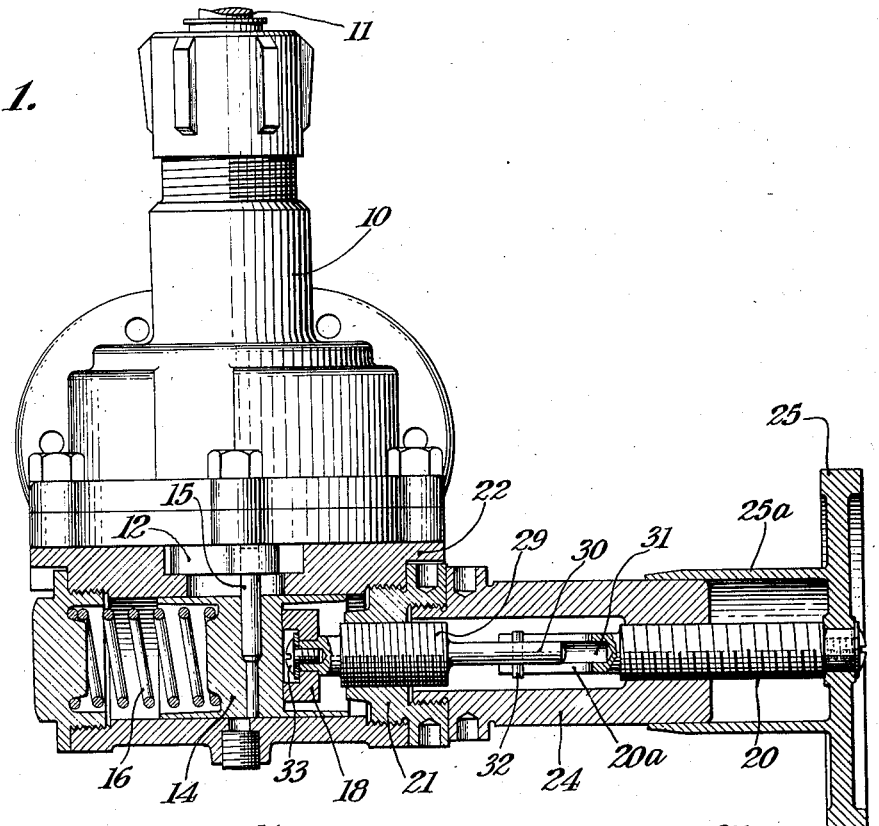
Fig. 1 is an elevational view with parts in section of a pump provided with the preferred form of variable volume control.
Figure 2:
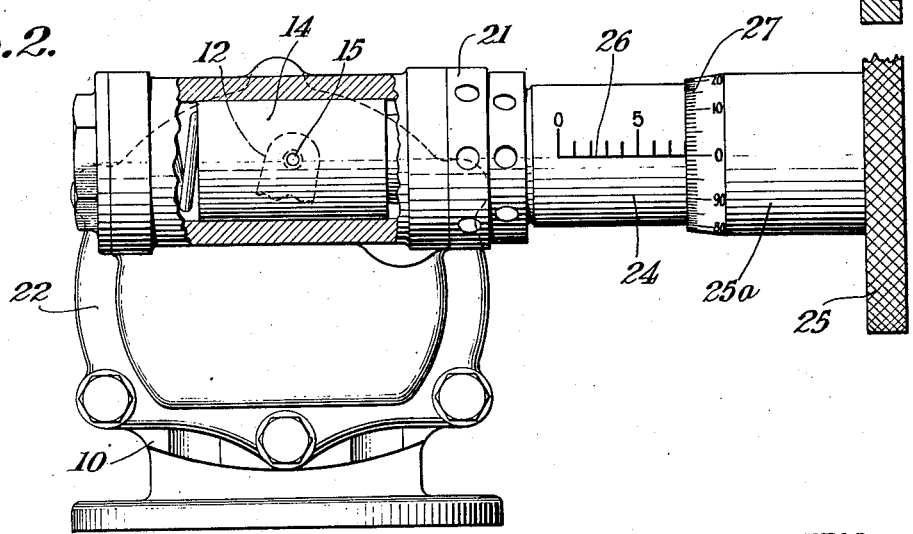
Fig. 2 is a plan view of the device shown in Figure 1.

Although my invention has general application, it has especial advantage in connection with a positive displacement rotary pump such as that generally illustrated in the Cornell patent referred to and that of the type commonly made by the Yale and Towne Manufacturing Company. In such a pump the body, generally indicated at 10, contains an operating chamber (not shown), in which a rotor and a piston and a shuttle are operated at a predetermined motor speed by means of the shaft 11. Although the details of construction of the pump parts are not shown, it is to be understood that the shuttle is mounted on a lever or plunger that can slide from a position concentric with the shaft to a full eccentric position, in which the reciprocating motion will be at its maximum. This lever is generally indicated at 12, and its position is controlled by the volume control pump plunger 14, which through pin 15 locates the shuttle position and thereby determines the capacity of the pump.

Normally the volume control pump plunger 14 is held in a predetermined position against the force of a spring 16 by means of a screw which engages the volume control head washer 18. Heretofore this head washer has been moved directly by the micrometer screw spindle 20; and, by rotation of the handwheel 25, accurate adjustment of the pump volume was obtained.

In accordance with my preferred form of embodiment of the invention, I prefer to insert an adapter member and an intermediate screw spindle between the micrometer screw spindle 20 and the volume control head washer 18. This adapter is generally indicated at 21 and includes a screw threaded portion which screws into the pump under-body 22 and which is provided with a screw threaded recess to receive the screw threaded end of the micrometer barrel 24. The micrometer spindle 20 is threaded into the barrel 24 and is secured to the handwheel 25 and micrometer thimble 25a in the usual manner. The micrometer barrel 24 as well as the micrometer thimble 25a is provided with the usual decimal scales as indicated at 26 and 27 respectively.

The adapter 21 carries the intermediate screw spindle 29 having the spindle extension 30, which projects into a cylindrical bore 31 in the micrometer spindle extension 20a. Preferably the micrometer spindle extension 20a is slotted to receive a pin 32 or similar coupling which projects through the spindle extension 30 so that rotation of the handwheel 25 will positively turn intermediate screw spindle 29. Screw spindle 29 on its opposite end is suitably attached to the volume control head washer 18 as by means of the stud 33.

The operation of the device is as follows:

If a thread pitch of the micrometer screw spindle 20 is assumed such that it contains ten threads per inch and if a thread pitch of the intermediate screw spindle 29 is assumed such that it also contains ten threads per inch, any movement of the micrometer handwheel 25 causes an identical movement of the volume control head washer 18 and, therefore, the volume control pump plunger 14. In such case the adjustment is similar to that now in common use, and the range of the scales on the micrometer represents the full range of the pump volume.

If, however, it is desired to have the full range movement of the micrometer handwheel 25 cause only a fractional change in the capacity of the pump, an adapter 21 may be substituted in which the intermediate screw 29 has more threads per inch than the micrometer screw 20. If, for example, there are twenty threads per inch on screw 29, the movement of the micrometer handwheel 25 through its entire range will bring about a movement of the volume control pump plunger 14 through one-half its range only.

For blending lubricating oil with standardized pumps, a few standard size adapters generally suffice inasmuch as the desired capacity of such a pump may then be limited from 0 to 10 percent, from 0 to 50 percent, from 0 to 66⅔ percent, or from 0 to 80 percent as by using intermediate screws having 100 threads per inch, 20 threads per inch, 15 threads per inch, or 12.5 threads per inch when the micrometer screw has 10 threads per inch.

It will be apparent that this intermediate screw coupling arrangement is available for any micrometer adjustment whether it is used with a pump, an electrical device, or other apparatus. It permits a substantially fool-proof and simplified setting practice and makes it impossible to accidentally set a control device in a manner other than that in accordance with the predetermined proportional ratio although, if desired, the adapter can be quickly removed and a substitute introduced.

While I have shown and described a preferred form of embodiment of my invention, I am aware that modifications may be made thereto; and I, therefore, desire a broad interpretation of my invention within the scope and spirit of the disclosure herein and of the claims appended hereinafter.

I claim:

1. A micrometric adjusting device comprising a body, a manually operable primary micrometer screw in screw-threaded engagement with said body, an adapter member having a screw-threaded bore, means releasably securing said adapter member to said body in a fixed relation to the latter, a secondary micrometer screw screw-engaged in said bore of the adapter member, and a releasable coupling operatively connecting said primary screw to said secondary screw and constructed and arranged to key said screws together against relative rotative movement and permit one screw to move axially relatively to the other screw; and means for mounting said device in a position to dispose said secondary screw in operative relation to an element to be adjusted for adjustment of said element by turning said primary screw.

2. A micrometric adjusting device comprising a barrel internally screw-threaded at one end, a manually operable primary micrometer screw screw-engaged in said barrel-end, said barrel being externally screw-threaded at its opposite end, an adapter body having an internal screw thread screw-engaged with said externally threaded end of the barrel to releasably secure it in a fixed relation thereto, said adapter body having a screw-threaded bore in axial alignment with said primary screw, a secondary micrometer screw screw-engaged in said bore and having a pitch different from that of said primary screw, a slip-joint coupling between said screws keying them together against relative rotative movement and permitting relative axial movement therebetween; and means for mounting said device in a position to dispose the outer end of said secondary screw in operative relation to an element to be adjusted for adjustment of said element by turning the primary screw.

3. A micrometric adjusting device comprising a barrel internally screw-threaded at one end, a manually operable primary micrometer screw screw-engaged in said barrel-end, said barrel being externally screw-threaded at its opposite end, an adapter body having an internal screw thread screw-engaged with said externally threaded end of the barrel to releasably secure it in a fixed relation thereto, said adapter body having a screw-threaded bore in axial alignment with said primary screw, a secondary micrometer screw screw-engaged in said bore and having a pitch different from that of said primary screw, a slip-joint coupling between said screws keying them together against relative rotative movement and permitting relative axial movement therebetween, said adapter body having an external screw thread for mounting said device in a position to dispose the outer end of said secondary screw in operative relation to an element to be adjusted for adjustment of said element by turning the primary screw.

GEORGE A. BATE.